US010490966B1

United States Patent
Huang et al.

(10) Patent No.: US 10,490,966 B1
(45) Date of Patent: Nov. 26, 2019

(54) OPTICAL FIBER DEVICE

(71) Applicants: Ye Huang, Simsbury, CT (US); Gregory D. Goodno, Los Angeles, CA (US); Joshua E. Rothenberg, Los Angeles, CA (US)

(72) Inventors: Ye Huang, Simsbury, CT (US); Gregory D. Goodno, Los Angeles, CA (US); Joshua E. Rothenberg, Los Angeles, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 15/851,319

(22) Filed: Dec. 21, 2017

Related U.S. Application Data

(60) Provisional application No. 62/439,365, filed on Dec. 27, 2016.

(51) Int. Cl.
*H01S 3/067* (2006.01)
*H01S 3/091* (2006.01)
*H01S 3/16* (2006.01)

(52) U.S. Cl.
CPC .......... *H01S 3/06708* (2013.01); *H01S 3/091* (2013.01); *H01S 3/1608* (2013.01); *H01S 3/1616* (2013.01); *H01S 3/1618* (2013.01)

(58) Field of Classification Search
CPC .... H01S 3/06708; H01S 3/091; H01S 3/1608; H01S 3/1618; H01S 3/1616
See application file for complete search history.

(56) References Cited

U.S. PATENT DOCUMENTS

| | | | | |
|---|---|---|---|---|
| 3,355,674 A | * | 11/1967 | Hardy | H01S 3/025 359/341.3 |
| 4,829,529 A | | 5/1989 | Kafka | |
| 5,867,305 A | * | 2/1999 | Waarts | H01S 3/06754 359/337.12 |
| 2002/0172486 A1 | * | 11/2002 | Fermann | H01S 3/06708 385/128 |
| 2004/0156403 A1 | * | 8/2004 | Carter | G02B 6/255 372/20 |
| 2017/0276869 A1 | * | 9/2017 | Setmire | G02B 6/036 |

OTHER PUBLICATIONS

Snitzer, et al.: "Double-Clad, Offset-Core Nd Fiber Laser" (first report of cladding pumping), Proc. Conf. Optical Fiber Sensors, Postdeadline paper PD5 (1988).

(Continued)

*Primary Examiner* — Xinning(Tom) Niu
(74) *Attorney, Agent, or Firm* — Tarolli, Sundheim, Covell & Tummino LLP

(57) ABSTRACT

One example includes an optical fiber device. The device includes an optical fiber core that extends axially along a length of the optical fiber device and an optical fiber cladding that surrounds the optical fiber core and extends axially along a length of the optical fiber device. The device also includes a polymer inner jacket that surrounds the optical fiber cladding and extends axially along a length of the optical fiber device. The device further includes a thermally-conductive outer jacket that surrounds the polymer inner jacket and extends axially along a length of the optical fiber device.

12 Claims, 2 Drawing Sheets

(56) References Cited

OTHER PUBLICATIONS

Yu, et al.: "All-glass Fiber Amplifier Pumped by Ultra-high Brightness Pumps," Fiber Lasers XIII: Technology, Systems, and Applications, edited by John Ballato, Proc. of SPIE vol. 9728, 972806 • © 2016 SPIE.

Yu, et al.: "Diode-pumped narrow linewidth multi-kW metalized Yb fiber amplifier," Advanced Solid State Lasers Conference, paper ATu6A.1 (Nov. 1, 2016).

Daniel, et al.: "Metal clad active fibres for power scaling and thermal management at kW power levels," Optics Express, vol. 24, No. 16, 185928 (2016).

\* cited by examiner

OPTICAL FIBER DEVICE

RELATED APPLICATIONS

This application claims priority from U.S. Provisional Application Ser. No. 62/439,365, filed 27 Dec. 2016, which is incorporated herein in its entirety.

TECHNICAL FIELD

This disclosure relates generally to optical systems, and more specifically to an optical fiber device.

BACKGROUND

Typical optical fibers include a core material and a cladding material, with each of the core and the cladding being fabricated from fused silica and having dissimilar refractive indices. A fiber can be formed by drawing a preform, which can be a large mass that includes the core and cladding materials arranged in a shape that can resemble a cross-section of the finished fiber. The preform can be drawn in a fiber drawing tower, such that the preform can be heated and stretched from one end to form the optical fiber. As an example, optical fibers can be implemented in fiber lasers, such as for use in directed energy (DE) laser weapons. A DE laser weapon system can, for example, require near diffraction-limited (DL) laser sources with high optical power (e.g., at least 100 kW). As an example, to achieve a high optical power without degradation of beam quality, multiple fiber lasers can be combined via spectral or coherent beam combining.

SUMMARY

One example includes an optical fiber device. The device includes an optical fiber core that extends axially along a length of the optical fiber device and an optical fiber cladding that surrounds the optical fiber core and extends axially along a length of the optical fiber device. The device also includes a polymer inner jacket that surrounds the optical fiber cladding and extends axially along a length of the optical fiber device. The device further includes a thermally-conductive outer jacket that surrounds the polymer inner jacket and extends axially along a length of the optical fiber device.

Another example includes an optical fiber device. The device includes an optical fiber core that extends axially along a length of the optical fiber device and an optical fiber cladding that surrounds the optical fiber core and extends axially along the length of the optical fiber device. The device also includes an inner jacket that surrounds the optical fiber cladding and extends axially along a length of the optical fiber device, the inner jacket having an average circumferential thickness of less than or equal to approximately 20 μm and having an index of refraction that is less than an index of refraction of the optical fiber cladding. The device further includes an outer jacket that surrounds the inner jacket and extends axially along a length of the optical fiber device.

Another example includes fiber laser system. The system includes an optical beam generator system configured to generate an optical beam and an optical fiber device. The optical fiber device includes an optical fiber core that extends axially along a length of the optical fiber device and is configured to receive the optical beam, and an optical fiber cladding that surrounds the optical fiber core and extends axially along the length of the optical fiber device. The optical fiber device also includes a polymer inner jacket that surrounds the optical fiber cladding and extends axially along a length of the optical fiber device, and a thermally-conductive outer jacket that surrounds the polymer inner jacket and extends axially along a length of the optical fiber device. The fiber laser system further includes an optical pump system configured to launch optical pumping light to the optical fiber cladding to amplify the optical beam

DETAILED DESCRIPTION

This disclosure relates generally to optical systems, and more specifically to an optical fiber device. An optical fiber device includes an optical fiber core and an optical fiber cladding surrounding the optical fiber core. The optical fiber core can be configured, for example, as a low-order mode core to propagate an optical beam. The optical fiber cladding can be configured to receive launched optical pump light to provide amplification of the optical beam. As an example, the optical fiber cladding can have a launch numerical aperture of approximately 0.46, and can have a polygonal (e.g., octagonal) cross-section of approximately 400 μm with respect to an axis that extends radially from a center of the octagonal cross-section perpendicular through an octagonal side to facilitate absorption by the optical fiber core of pump light provided via optical pumping of the optical fiber cladding.

In addition, the optical fiber device can include an inner jacket that is formed from a polymer material (e.g., an acrylate polymer) that surrounds the optical fiber cladding, and an outer jacket that is formed from a thermally-conductive material (e.g., a metallic material, such as indium) that surrounds the inner jacket layer. As an example, the inner jacket can have an average circumferential thickness of less than or equal to approximately 20 μm. In the example of an octagonal cross-section of the optical fiber cladding, the inner jacket can have a thickness that is less than approximately 25 μm with respect to an axis that extends radially from a center of the octagonal cross-section perpendicular through an octagonal side, and greater than approximately 5 μm with respect to an axis that extends radially from the center of the octagonal cross-section perpendicular through an intersection of octagonal sides. However, other arrangements of the cross section of the optical fiber cladding are possible, such that a substantially round cross-sectional shape can have an approximately uniform thickness of between approximately 5 μm and approximately 20 μm. The inner jacket can have a refractive index that is less than a refractive index of the optical fiber cladding. Therefore, the inner jacket can be configured to capture and propagate optical pumping light in the optical fiber cladding while maintaining a large numerical aperture for better pump beam absorption, while the outer jacket can act as a heatsink and can provide sufficient protection from mechanical stress. Accordingly, the optical fiber device can be implemented as an optical fiber laser that provides an optical beam having a very narrow linewidth and high optical power.

Figure 1:
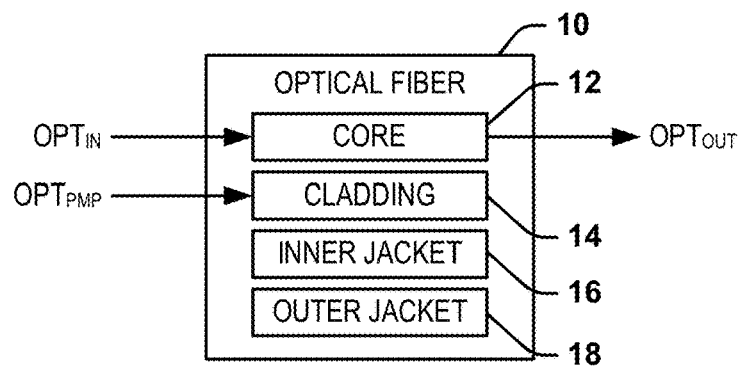
FIG. 1 illustrates an example diagram of an optical fiber device.

FIG. 1 illustrates an example diagram of an optical fiber device 10. The optical fiber device 10 can be implemented in any of a variety of optical applications, such as for communication or as an optical fiber laser. For example, an optical fiber laser that implements the optical fiber device 10 can be configured to deliver a high-power optical beam (e.g., for welding or in a directed energy (DE) weapon). However, the optical fiber device 10 can also be implemented for any of a variety of other optical beam or signal applications, such as to propagate a modulated optical signal to carry data.

The optical fiber device 10 can include an optical fiber core 12 that extends axially along a length of the optical fiber device 10. In the example of FIG. 1, the optical fiber core 12 is configured to propagate an optical beam, demonstrated as provided to the optical fiber core 12 as an optical input beam $OPT_{IN}$, and which is provided from the optical fiber core 12 as an optical output beam $OPT_{OUT}$. The optical fiber device 10 also includes an optical fiber cladding 14 that surrounds the optical fiber core 12 and likewise extends axially along the length of the optical fiber device 10. The optical fiber cladding 14 is configured to receive optical pump energy, demonstrated in the example of FIG. 1 as beam $OPT_{PMP}$, to provide amplification of the optical input beam $OPT_{IN}$, such that the optical output beam $OPT_{OUT}$ is provided at a greater optical power than the optical input beam $OPT_{IN}$.

As an example, the optical fiber core 12 can be formed as a low-order mode optical fiber core to propagate the optical input beam $OPT_{IN}$ as an approximate diffraction limited optical beam. As described herein, a low-order mode optical fiber describes that the fiber radial refractive index profile is configured such that the optical fiber core 12 can guide only a few spatial modes with low loss. For example, the optical fiber core 12 can be formed as an approximately 20 μm diameter glass core having an index of refraction that can be slightly larger (e.g., approximately 0.0015 larger) than the refractive index of the optical fiber cladding 14, and the optical fiber core 12 can be doped with an active rare-earth lasing ion, such as ytterbium (Yb), erbium (Er), and/or thulium (Tm). As another example, the optical fiber cladding 14 can be configured as having a lower index of refraction than the optical fiber core 12, and can have a diameter sufficient to receive the optical pump energy $OPT_{PMP}$ in an efficient manner. For example, the optical fiber cladding 14 can be fabricated as glass and can have a diameter of approximately 400 μm.

In addition, in the example of FIG. 1, the optical fiber device 10 includes an inner jacket 16 and an outer jacket 18. The inner jacket 16 can surround the optical fiber cladding 14 and can be formed from a polymer material (e.g., an acrylate polymer). As an example, the inner jacket 16 can be formed as a substantially thin layer surrounding the optical fiber cladding 14, such as having an average circumferential thickness of less than or equal to approximately 20 μm. For example, the inner jacket 16 can have a lower index of refraction than the optical fiber cladding 14 to facilitate a numerical aperture (NA) of the optical fiber cladding 14 that is greater than approximately 0.4 (e.g., approximately 0.46) so as to facilitate trapping and propagation of the optical pump energy $OPT_{PMP}$ in the optical fiber cladding 14 via total internal reflection. The outer jacket 18 surrounds the inner jacket 16, and can be formed from a material having a high thermal conductance, such as a metallic material (e.g., indium (In) or an indium alloy), or a similar material with a high thermal conductivity and a low melting temperature. As an example, the outer jacket 18 can have a circumferential thickness of less than approximately 150 m, such as approximately 100 μm.

By implementing the combination of the inner jacket 16 and the outer jacket 18, the optical fiber device 10 can exhibit substantially enhanced performance relative to typical optical fibers. For example, by implementing the inner jacket 16, the optical fiber cladding 14 can be fabricated to have a substantially high (e.g., approximately 0.46) launch NA, as opposed to a launch NA of typical optical fibers that implement doped glass coatings over the optical fiber claddings (e.g., having a launch NA of approximately 0.24). Accordingly, the optical pump energy $OPT_{PMP}$ can be provided via all-fiber coupled, commercial low-brightness high-power diodes, such as from one end or side of the optical fiber device 10. Additionally, by fabricating the inner jacket 16 as a very thin layer (e.g., less than approximately 20 μm on average) relative to typical polymer coatings of optical fiber devices (e.g., having a thickness of approximately 75 μm or more), the thermal impedance of the optical fiber device 10 can be reduced by greater than three times. As a result, the optical fiber device 10 can exhibit a proportionate increase in linear fiber thermal load without damage. Furthermore, because the outer jacket 18 can be formed from a metallic or other highly thermally-conductive material (e.g., including indium), the outer jacket 18 can provide protection of the optical fiber device 10 from mechanical stresses (e.g., as provided during handling or coiling of the optical fiber device 10), and can also provide thermal conductivity to provide sufficient azimuthal spreading of heat generated in the optical fiber device 10. As an example, the outer jacket 18 can be formed from a material having a thermal conductivity of greater than or equal to approximately 5 W/m-K. Therefore, the outer jacket 18 can render the optical fiber device 10 less susceptible to local heating and can provide thermal insensitivity to the geometry of heat sinking.

The combination of the thin polymer inner jacket 16 and the outer jacket 18 can also provide additional advantages of the optical fiber device 10 that are competing design considerations in typical optical fiber devices. For example, the optical fiber device 10 can be easily integrated in and/or with other optical systems with respect to splicing and/or launching of optical power, and can be fabricated to have a decreased fiber length to enable increased fiber power and/or reduction in fiber non-linear impairments. For example, the optical pump power $OPT_{PMP}$ could be increased to increase the power of the optical output beam $OPT_{OUT}$ without exceeding the fiber damage temperature based on the combination of the thin polymer inner jacket 16 and the outer jacket 18. Alternatively or additionally, the doping level of the optical fiber core 12 could be increased to enable reduction in the length of the optical fiber device 10 without detrimentally impacting absorption of the optical pump power $OPT_{PMP}$. As a result, self-phase modulation (SPM) can be decreased proportionally with a reduction in length of the optical fiber device 10, while the stimulated Brillouin scattering (SBS) threshold can be significantly increased to enable narrower linewidth emission of the optical output beam $OPT_{OUT}$. For example, with absorption of approximately 3 dB/m at approximately 976 nm, 4.5 meters of length of the optical fiber device 10 can absorb about 13.5 dB of pump light. With a co-pumped configuration, the thermal load can be about 200 W/m to be able to generate output power of more than 3 kW.

Figure 2:
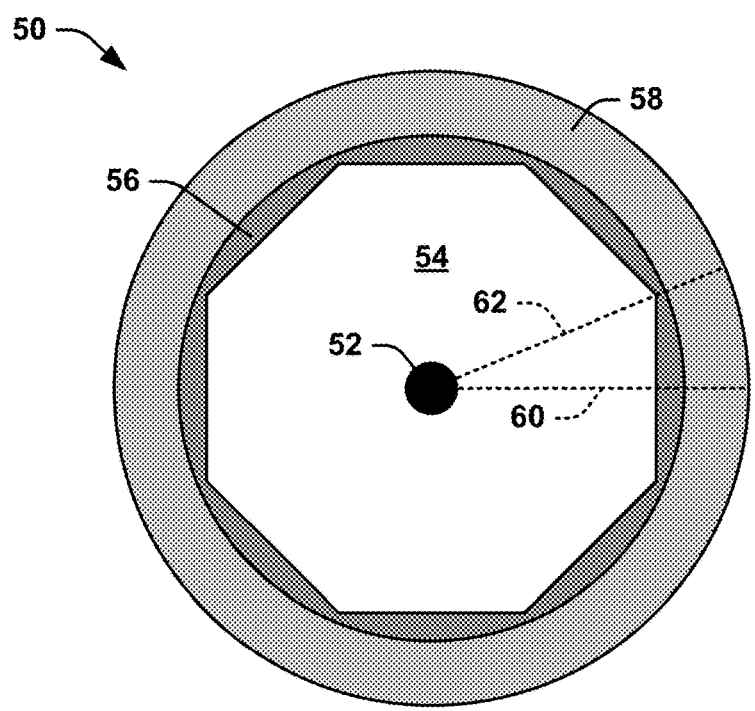
FIG. 2 illustrates an example diagram of a cross-section of an optical fiber device.

FIG. 2 illustrates an example diagram of a cross-section of an optical fiber device 50. The optical fiber device 50 can correspond to the optical fiber device 10 in the example of FIG. 1. Therefore, reference is to be made to the example of FIG. 1 in the following description of the example of FIG. 2.

The optical fiber device 50 can include an optical fiber core 52 that is configured to propagate an optical beam (e.g., an optical beam), such as the optical input beam $OPT_{IN}$ in the example of FIG. 1 to generate the optical output beam $OPT_{OUT}$. For example, the optical fiber core 52 can be formed as an approximately 20 µm diameter glass core having a high index of refraction, and can be doped with an active rare-earth lasing ion, such as ytterbium (Yb), erbium (Er), and/or thulium (Tm). The optical fiber device 50 also includes an optical fiber cladding 54 that surrounds the optical fiber core 52. The optical fiber cladding 54 is configured to receive optical pump energy (e.g., the optical pump energy $OPT_{PMP}$) to provide amplification of the optical beam propagating in the optical fiber core 52. As an example, the optical fiber cladding 54 can be fabricated as glass and can have a diameter of approximately 400 µm to facilitate a launch numerical aperture (NA) of greater than approximately 0.4 (e.g., approximately 0.46). In the example of FIG. 2, the optical fiber cladding 54 is demonstrated as having an octagonal cross-section. However, it is to be understood that the cross-section of the optical fiber cladding can have any of a variety of polygonal cross-sectional arrangements, and is thus not limited to an octagonal cross-section. In the example of FIG. 2, the octagonal cross-section of the optical fiber cladding 54 can be configured to provide greater internal reflection of the optical pump energy $OPT_{PMP}$, and thus greater absorption of the optical pump energy $OPT_{PMP}$ by the optical fiber core 52.

In addition, in the example of FIG. 2, the optical fiber device 50 includes an inner jacket 56 and an outer jacket 58. The inner jacket 56 surrounds the optical fiber cladding 54 and can be formed from a polymer material (e.g., an acrylate polymer). As an example, the inner jacket 56 can be formed as a substantially thin layer surrounding the optical fiber cladding 54, such as having an average circumferential thickness of less than or equal to approximately 20 µm. As an example, the inner jacket 56 can have a thickness of less than approximately 20 µm (e.g., between 5 µm and 25 µm with respect to polygonal intersections and sides, respectively, of the cross section of the inner jacket 56) with respect to an axis 60 that extends radially from a center of the octagonal cross-section perpendicular through an octagonal side of the octagonal cross section. As another example, the inner jacket 56 can have a thickness of greater than approximately 5 µm with respect to an axis 62 that extends radially from the center of the octagonal cross-section perpendicular through an intersection of octagonal sides of the octagonal cross section to substantially prevent evanescent wave penetration to the outer jacket 58. However, other arrangements of the cross section of the optical fiber cladding 54 are possible, such that a substantially round cross-sectional shape of the optical fiber cladding 54 can provide for an approximately uniform thickness of the inner jacket 56 of between approximately 5 µm and approximately 20 µm.

The outer jacket 58 surrounds the inner jacket 56, and can be formed from a metallic or other thermally conductive material, such as indium (In) or an indium alloy. For example, the metallic material of the outer jacket 58 can be selected based on a relatively low melting point temperature and a relatively high thermal conductivity. As a result, the material of the outer jacket 58 can be easily drawn in a drawing tower during fabrication of the optical fiber device 50 without damaging the inner jacket 56, and can facilitate sufficient thermal dissipation of heat that is generated in the optical fiber device 50 in response to the optical pump power $OPT_{PMP}$ during operation of the optical fiber device 50.

Additionally, the outer jacket 58 can be bonded to an additional heat sink to provide additional thermal dissipation for the optical fiber device 50 based on bonding the outer jacket 58 to the additional heat sink via solder and/or a thermal paste. As an example, the outer jacket 58 can have a circumferential thickness of less than approximately 150 µm, such as approximately 100 µm.

Figure 3:
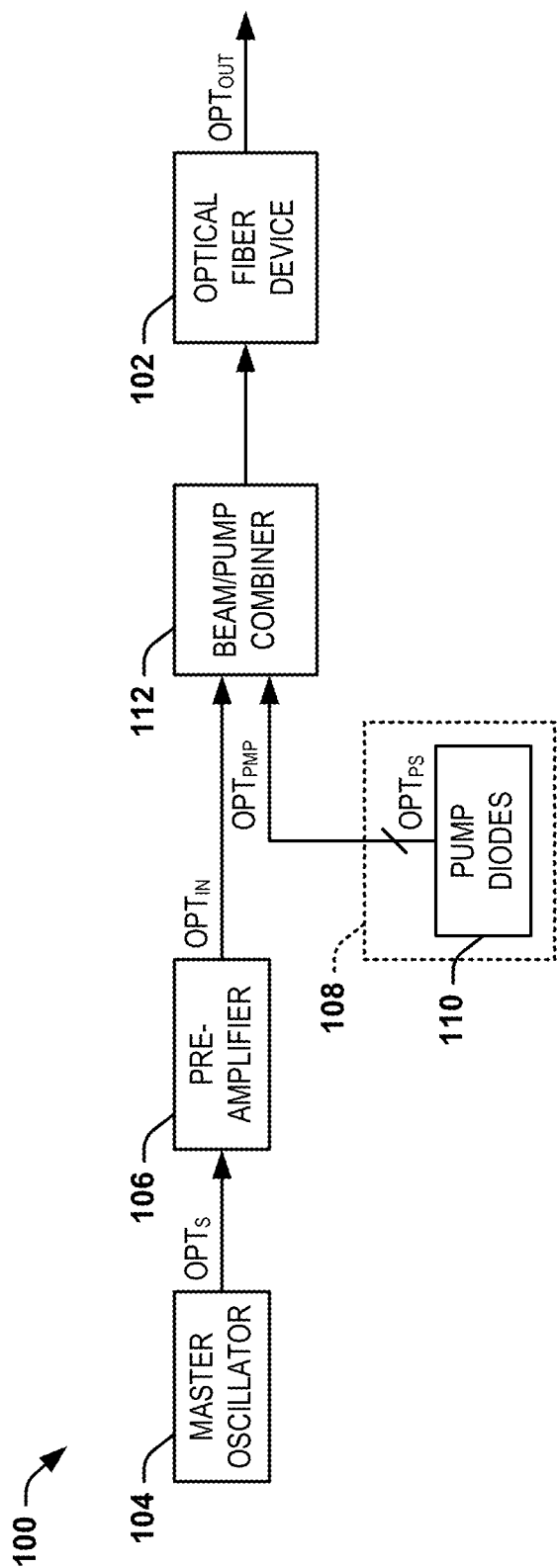
FIG. 3 illustrates an example diagram of an optical fiber laser.

FIG. 3 illustrates an example diagram of an optical fiber laser system 100. The optical fiber laser system 100 can be implemented in a variety of optical applications, such as directed energy (DE) weapons. The optical fiber laser system 100 includes an optical fiber device 102 which can correspond to the optical fiber device 10 or the optical fiber device 50 in the respective examples of FIG. 1 or 2. Therefore, reference is to be made to the examples of FIGS. 1 and 2 in the following description of the example of FIG. 3.

Similar to as described previously, the optical fiber device 102 can include an optical fiber core, an optical fiber cladding, an inner jacket (e.g., a polymer inner jacket), and an outer jacket (e.g., a high thermal-conductivity outer jacket). The optical fiber laser system 100 also includes a master oscillator 104 that is configured to generate an optical input beam $OPT_S$ having specific optical characteristics (e.g., wavelength). The optical input beam $OPT_S$ is provided to a pre-amplifier 106 that is configured to provide initial high-gain amplification of the optical input beam $OPT_S$ to provide an amplified optical input beam $OPT_{IN}$. The amplified optical input beam $OPT_{IN}$ is provided into the optical fiber core of the optical fiber device 102, such as via splicing, and is provided as an output from the optical fiber device 102 as an output optical beam $OPT_{OUT}$.

Additionally, the optical fiber laser system 100 includes an optical pump system 108 that is configured to launch optical pumping light $OPT_{PMP}$ to the optical fiber cladding of the optical fiber device 102. In the example of FIG. 3, the optical pump system 108 includes a plurality of pump diodes 110 that are each configured to generate an optical pump beam $OPT_{PS}$ that corresponds to a portion of the optical pump power $OPT_{PMP}$. The optical pump beams $OPT_P$s are combined via an all-fiber or free-space beam/pump combiner 112, which can be configured, for example, as either a side pump or an end pump. Thus, the beam/pump combiner 112 can launch the combined optical pump power $OPT_{PMP}$ into the optical fiber cladding of the optical fiber device 102 together with optical beam $OPT_{IN}$ the core. Accordingly, the optical pump power $OPT_{PMP}$ can amplify the optical beam $OPT_{IN}$ propagating in the optical fiber core of the optical fiber device 102 to provide the optical output beam $OPT_{OUT}$.

As an example, the optical fiber device 102 can generate the optical output beam $OPT_{OUT}$ in the range of 3-5 kW based on an industry-standard architecture of six pump diodes 110, each emitting up to 1 kW of power at approximately 976 nm. For example, for an ytterbium-doped optical fiber device 102, the reduction in length from a typical conventional optical fiber device can be about two times (e.g., from approximately 9 meters at 1.5 dB/m absorption to approximately 4.5 m at 3 dB/m absorption), with concomitant reduction in both SPM and SBS nonlinearities. As a result, the optical fiber device 102 having a length of approximately 4.5 m can operate at approximately twice the power of typical optical fiber devices while exhibiting approximately the same nonlinearity effects. As an example, a typical optical fiber device of approximately 9 meters in length has a B-integral of approximately 4 rad/kW of output power, while the optical fiber device 102 having a length of approximately 4.5 m can have a B-integral of approximately 2 rad/kW. Similarly, a typical optical fiber device of approximately 9 meters has an SBS-limited linewidth of approximately 10 GHz/kW, while the optical fiber device 102 having a length of approximately 4.5 m can have an SBS-limited linewidth of approximately 5 GHz/kW. Accordingly, the optical fiber laser system 100 that implements the optical fiber device 102 having a polymer inner jacket and an outer jacket (e.g., metallic outer jacket), as described herein, can have substantially improved characteristics over typical optical fiber devices.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An optical fiber device comprising:
   an optical fiber core that extends axially along a length of the optical fiber device;
   an optical fiber cladding that surrounds the optical fiber core and extends axially along the length of the optical fiber device, the optical fiber cladding having a polygonal cross-section to facilitate absorption of pump light provided via optical pumping of the optical fiber cladding by the optical fiber core;
   a polymer inner jacket that surrounds the optical fiber cladding and extends axially along a length of the optical fiber device, the polymer inner jacket having a thickness of less than approximately 25 μm with respect to an axis that extends radially from a center of the polygonal cross-section perpendicular through a side of the polygonal cross section, and has a thickness of greater than approximately 5 μm with respect to an axis that extends radially from the center of the polygonal cross-section perpendicular through an intersection of sides of the polygonal cross-section; and
   a thermally-conductive outer jacket that surrounds the polymer inner jacket and extends axially along a length of the optical fiber device.

2. The device of claim 1, wherein the polymer inner jacket has an index of refraction that is less than an index of refraction of the optical fiber cladding.

3. The device of claim 1, wherein the polymer inner jacket has an average circumferential thickness of less than or equal to approximately 20 μm.

4. The device of claim 1, wherein the polymer inner jacket is formed from an acrylate polymer material.

5. The device of claim 1, wherein the thermally-conductive outer jacket is formed from a material having a thermal conductivity of greater than or equal to approximately 5 W/m-K.

6. The device of claim 1, wherein the optical fiber core is configured as a low-order-mode optical fiber core.

7. The device of claim 1, wherein the optical fiber cladding has a launch numerical aperture of greater than approximately 0.4.

8. A fiber laser system comprising the optical fiber device of claim 1, the system further comprising:
   an optical beam generator system configured to provide an optical beam into the optical fiber core; and
   an optical pump system configured to launch optical pumping light to the optical fiber cladding to amplify the optical beam.

9. The fiber laser system of claim 8, wherein the optical pump system comprises:
   a plurality of pump diodes each configured to provide an optical pump beam; and
   an all-fiber pump combiner configured to combine the optical pump beam associated with each of the plurality of pump diodes to generate the optical pumping light.

10. An optical fiber device comprising:
    an optical fiber core that extends axially along a length of the optical fiber device;
    an optical fiber cladding that surrounds the optical fiber core and extends axially along the length of the optical fiber device, the optical fiber cladding having a polygonal cross-section to facilitate absorption of pump light provided via optical pumping of the optical fiber cladding by the optical fiber core;
    an inner jacket that surrounds the optical fiber cladding and extends axially along a length of the optical fiber device, the inner jacket having an average circumferential thickness of less than or equal to approximately 20 μm and having an index of refraction that is less than an index of refraction of the optical fiber cladding, the inner jacket having a thickness of less than approximately 25 μm with respect to an axis that extends radially from a center of the polygonal cross-section perpendicular through a side of the polygonal cross section, and has a thickness of greater than approximately 5 μm with respect to an axis that extends radially from the center of the polygonal cross-section perpendicular through an intersection of sides of the polygonal cross-section; and
    an outer jacket that surrounds the inner jacket and extends axially along a length of the optical fiber device.

11. The device of claim 10, wherein the inner jacket is formed from a polymer material, and wherein the outer jacket is formed from a metallic material.

12. A fiber laser system comprising the optical fiber device of claim 10, the system further comprising:
    an optical beam generator system configured to provide an optical beam into the optical fiber core; and
    an optical pump system configured as an all-fiber or free-space optical pump to launch optical pumping light to the optical fiber cladding to amplify the optical beam.

* * * * *